(12) United States Patent
Justak

(10) Patent No.: US 9,199,569 B2
(45) Date of Patent: Dec. 1, 2015

(54) TELESCOPING AND MAGNETIC TAILGATE RAMP

(76) Inventor: Jeffrey Justak, Lowell, IN (US)

( * ) Notice: Subject to any disclaimer, the term of this patent is extended or adjusted under 35 U.S.C. 154(b) by 610 days.

(21) Appl. No.: 13/494,100

(22) Filed: Jun. 12, 2012

(65) Prior Publication Data

US 2013/0028693 A1    Jan. 31, 2013

Related U.S. Application Data

(60) Provisional application No. 61/512,238, filed on Jul. 27, 2011.

(51) Int. Cl.
*B60P 1/43* (2006.01)
*B65G 69/30* (2006.01)

(52) U.S. Cl.
CPC ............... *B60P 1/435* (2013.01); *B65G 69/30* (2013.01)

(58) Field of Classification Search
CPC ............ B60P 1/43; B60P 1/435; B65G 69/30
USPC .............................................. 296/61; 414/537
See application file for complete search history.

(56) References Cited

U.S. PATENT DOCUMENTS

| | | | |
|---|---|---|---|
| 3,642,156 A * | 2/1972 | Stenson | 414/537 |
| 4,527,941 A * | 7/1985 | Archer | 414/537 |
| 4,628,561 A | 12/1986 | Kushniryk | |
| 4,864,673 A * | 9/1989 | Adaway et al. | 14/71.1 |
| 4,923,360 A * | 5/1990 | Beauchemin | 414/537 |
| 5,244,335 A | 9/1993 | Johns | |
| 5,273,335 A * | 12/1993 | Belnap et al. | 296/61 |
| 5,312,149 A | 5/1994 | Boone | |
| 5,536,058 A | 7/1996 | Otis | |
| 5,803,523 A * | 9/1998 | Clark et al. | 296/26.1 |
| 6,099,233 A * | 8/2000 | Craik | 414/537 |
| 6,454,338 B1 * | 9/2002 | Glickman et al. | 296/57.1 |
| 6,913,305 B1 * | 7/2005 | Kern et al. | 296/51 |
| 7,255,314 B2 * | 8/2007 | Hanson et al. | 248/277.1 |
| 7,549,692 B2 * | 6/2009 | Washington | 296/61 |
| 2002/0088065 A1 * | 7/2002 | Schmaltz et al. | 14/69.5 |
| 2007/0261181 A1 * | 11/2007 | Willard et al. | 14/71.1 |
| 2009/0044729 A1 | 2/2009 | Navarre | |
| 2011/0072596 A1 * | 3/2011 | Kenny | 14/69.5 |

* cited by examiner

*Primary Examiner* — James Keenan
(74) *Attorney, Agent, or Firm* — Daniel Boudwin; Global Intellectual Property Agency LLC

(57) ABSTRACT

Disclosed is a telescoping ramp, comprising a frame, a plurality of extendable ramp members and a magnetic base for securing to a tailgate structure. The ramp members comprise a plurality of aligned, telescoping members that form an extendable ramp, wherein the members form into one another and are extendable by separation of a first ramp end from an opposing second ramp end, the members being connected therebetween. The first ramp end connects to upstanding portions of the frame and within a slotted channel. The channel allows the first ramp end to be moved horizontally and vertically within the frame to position the condensed ramp within the frame interior, while also allowing the extended ramp to clear the frame and facilitate a smooth transition between the ramp and the frame when loading objects thereacross. The ramp members are box structures that condense into one another and include progressively tapering cross sections.

6 Claims, 5 Drawing Sheets

TELESCOPING AND MAGNETIC TAILGATE RAMP

CROSS REFERENCE TO RELATED APPLICATION

This application claims the benefit of U.S. Provisional Application No. 61/512,238 filed on Jul. 27, 2011, entitled "Magnetic Telescopic Tailgate Ramp." The patent application identified above is incorporated here by reference in its entirety to provide continuity of disclosure.

BACKGROUND OF THE INVENTION

1. Field of the Invention

The present invention relates to truck and trailer ramps. More specifically, the present invention pertains to an extendable, telescoping tailgate ramp adapted to connect to a vehicle tailgate using a plurality of magnetic anchors for the purposes of loading a motorcycle, ATV or similar item into the back of the vehicle.

Loading a motorcycle into a transport vehicle or onto an elevated plane, such as a the bed of a pickup truck or a trailer, requires the motorcycle to be driven up an inclined plane from the ground level and up to the vehicle level, whereafter the motorcycle may be secured to the transport vehicle. Traditional means of loading large articles and motorcycles into trucks in this fashion include the use of elongated ramp sections or planks of wood, which act as an inclined support for the motorcycle tires along a narrow path as it is driven into the truck bed. The use of such ramps can be problematic, as their elongated length limits their transportability and stowage, while their ability to securely attach to the transport vehicle and remain static is of primary importance, both for user safety and to prevent damage to the motorcycle if the ramp were to dislodge and fall. These concerns are even greater for make-shift ramps made from elongated wooden plank sections, which are not generally designed to carry significant load along their broad surface and can result in failure of the plank and the aforementioned safety and property damage risk upon failure.

More sophisticated tailgate ramps have been designed and disclosed in the prior art. These devices relate to structural members adapted to securely attach to a truck tailgate to minimize the risk of movement and to increase the load capacity of the ramp. Collapsible and condensable tailgate ramp assemblies are also available as a means of improving the stowage of a tailgate ramp and deploying the ramp only when required, wherein its structure is minimized when not in use. These assemblies include telescoping and expandable structures that allow the ramp to be condensed and then expanded as desired.

The present invention relates to a new and improved tailgate ramp assembly having a similarly condensable structure, however with improved elements that facilitate loading of a motorcycle and improved means of attaching the assembly to a truck tailgate. Specifically, the present invention comprises a frame structure having upstanding side portions that support a deployable set of telescoping members that form a continuous ramp section. The members attach to ends of the ramp, wherein the upper end is supported within a slide rail along the frame, allowing the upper portion of the ramp to be positioned along the base of the frame to create a smooth transition between the ramp and frame, while further allowing the frame to be positioned within the frame interior when condensed. The assembly is securable to a pickup truck tailgate utilizing magnetic anchors, which statically support the ramp device while in use and while stowed.

2. Description of the Prior Art

Devices have been disclosed in the prior art that relate to pickup truck ramps and motorcycle ramps. These include devices that have been patented and published in patent application publications. These devices generally relate to collapsible and telescoping ramp devices having familiar design elements for the purposes of loading cargo onto an elevated platform, and particularly into a pickup truck bed. The devices deemed most relevant to the present disclosure are herein described for the purposes of highlighting and differentiating the unique aspects of the present invention, and further highlighting the drawbacks existing in the prior art.

Specifically, U.S. Pat. No. 5,536,058 to Otis describes a tailgate ramp for mounting on a truck, wherein the ramp includes telescopically extending ramps that are stowed in pockets within the tailgate. The ramp comprises a frame, a hinge assembly that pivotally mounts the frame to the vehicle, and at least one ramp member adapted to support a second vehicle thereon. The ramp member includes at least two telescoping members having an extended and retracted configuration, wherein the retracted configuration is stowable within the frame of the device. Vertical sliding rollers permit movement of the ramp axle within the frame. The Otis device also describes several embodiments of the ramp, including one attached to the truck body and extending from the truck tailgate, and one having pivotable ramp members. While Otis device is similar in nature and a very relevant device to the present invention, the present invention provides a frame having a magnetic base and a frame that allows the telescoping frame members to slide along a vertical and horizontal plane prior to be stowed within the frame body in a horizontally condensed position.

U.S. Pat. No. 4,628,561 to Kushniryk is another such device that includes a compact ramp construction that comprises a series of nestable, telescopic modules that connect to a detachable anchor along one end of the ramp. The modules comprise pi-shape members having a pair of parallel side members and side walls spaced apart in slideably nestable relation. The modules collapse into a nested position that provides an assembly that is easily transportable and deployable for loading articles into an elevated platform, such as a vehicle tailgate. The modules of the Kushniryk device, while providing a simple cross section, include cross members having significant open space from one another, moving from the ground level to the tailgate along the modules. While this may be suited for larger vehicles or for climbing the ramp by foot, these spaces create gaps in support along the ramp, wherein the wheel of a motorcycle or ATV may become lodged. This creates problems when loading such vehicles, compounded by the fact that the user must further navigate the spaces as he or she accompanies the vehicle up the ramp. The present invention comprises a continuous ramp platform that is constructed of a plurality of telescoping members that form a cohesive and largely gapless support.

U.S. Pat. No. 5,312,149 to Boone describes a conventional pickup truck tailgate having an elongated slot along the upper margin of the tailgate from which three telescoping ramp sections may extend from. The ramp provides a progressively narrowing set of sections that allow the sections to telescope into one another and stow into the tailgate of the vehicle when not in use and deploy outwardly therefrom for providing a loading gate. The Boone devices discloses a tailgate ramp that is integrated into a truck tailgate, wherein the tailgate is lowered to a horizontal level before deploying the ramp from a cavity within the tailgate, whereby the ramp hinges downward and provides a ready ramp for loading heavy articles into the truck bed interior. The present invention contemplates an independent assembly that is mountable along a number of different platforms and supports, and is not necessarily limited to pickup truck tailgates. The base of the present invention is a magnetic frame having upstanding portions that support the tailgate ramp in a slideable manner to allow clearance between the ramp and the support, along with an interior portion that allows stowage of the condensed ramp when not in use.

U.S. Pat. No. 5,244,335 to Johns discloses a telescopic tailgate ramp of a similar nature as the Boone device, wherein the Johns device includes a base tray and a series of telescopically-connected trays that are stackable upon one another to replace an existing vehicle tailgate. The trays engage end pieces of preceding and succeeding trays to provide a stackable, deployable configuration wherein the end pieces are tenon-like portions that engage a channel. The trays are elongated, planar members that engage along their lateral sides, telescoping inward as the assembly is deployed from the tailgate hinge point to a ground surface. While provides a useful tailgate ramp, the Johns device suffers from the same drawback as the Boone device, wherein its structure is limited to a truck tailgate hinge point. Its structure, while providing a telescoping ramp, is also divergent from the present invention.

Finally, U.S. Published Patent Application Publication No. 2009/0044729 to Navarre discloses a truck running board and combination ramp device, wherein the running board comprises of a tubular beam that is detachable from the truck when not utilized as a running board for use as an article ramp onto the vehicle tailgate. Mounts on the tubular beam and a lockable retainer on the beam allow the device to be easily mounted and secured to a truck tailgate. The Navarre device is one that utilizes an existing structure related to a pickup truck for use as an affixable tailgate ramp, wherein no extra devices are necessary to be carried within the bed of the truck that are not already present. While providing a unique combination device, the structure of the Navarre devices is one of a constant length beam, wherein the structure of the present invention in one of a telescoping assembly of ramp elements that are stowable and deployable from a larger frame that is securable to a lowered tailgate or similar support structure.

The present invention is a new and improved ramp assembly that provides a continuous ramp platform, wherein gaps between telescoping members is minimized in its construction, and the placement of the ramp relative to the truck bed surface provide minimal steps or drop-offs. The frame of the assembly is one that is securely mounted utilizing a set of magnetic anchors, while providing support for an articulating ramp upper end, allowing modularly with regard to the ramp positioning and the transition between the ramp end, the frame interior and the truck bed surface. In light of devices in the prior art, it is submitted that the present invention is substantially divergent in design elements from the prior art, and consequently it is clear that there is a need in the art for an improvement to existing collapsible tailgate ramp devices. In this regard the instant invention substantially fulfills these needs.

SUMMARY OF THE INVENTION

In view of the foregoing disadvantages inherent in the known types of tailgate ramps now present in the prior art, the present invention provides a new telescoping ramp device wherein the same can be utilized for providing convenience for the user when loading a motorcycle onto a truck tailgate using a deployable and stowable assembly that is secured to the lowered truck tailgate.

It is therefore an object of the present invention to provide a new and improved tailgate ramp device that has all of the advantages of the prior art and none of the disadvantages.

It is another object of the present invention to provide a tailgate ramp assembly that is condensable and deployable when necessary, wherein the assembly comprises a plurality of telescoping members that form a ramp structure.

Another object of the present invention is to provide a tailgate ramp assembly having a frame structure that supports a slideable ramp for positioning the ramp along the frame and in relation to the loading surface.

Another object of the present invention is to provide a tailgate ramp assembly having a frame structure that is securable to a pickup truck tailgate via a plurality of magnetic anchors.

Yet another object of the present invention is to provide a tailgate ramp assembly that provides a continuous ramp section that is absent of large gaps that would otherwise hinder the movement of a wheeled vehicle thereon.

A final object of the present invention is to provide a tailgate ramp assembly that provides space for both a user and a motorcycle on the same ramp, along with a structure that is capable of supporting considerable load along its ramp length.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
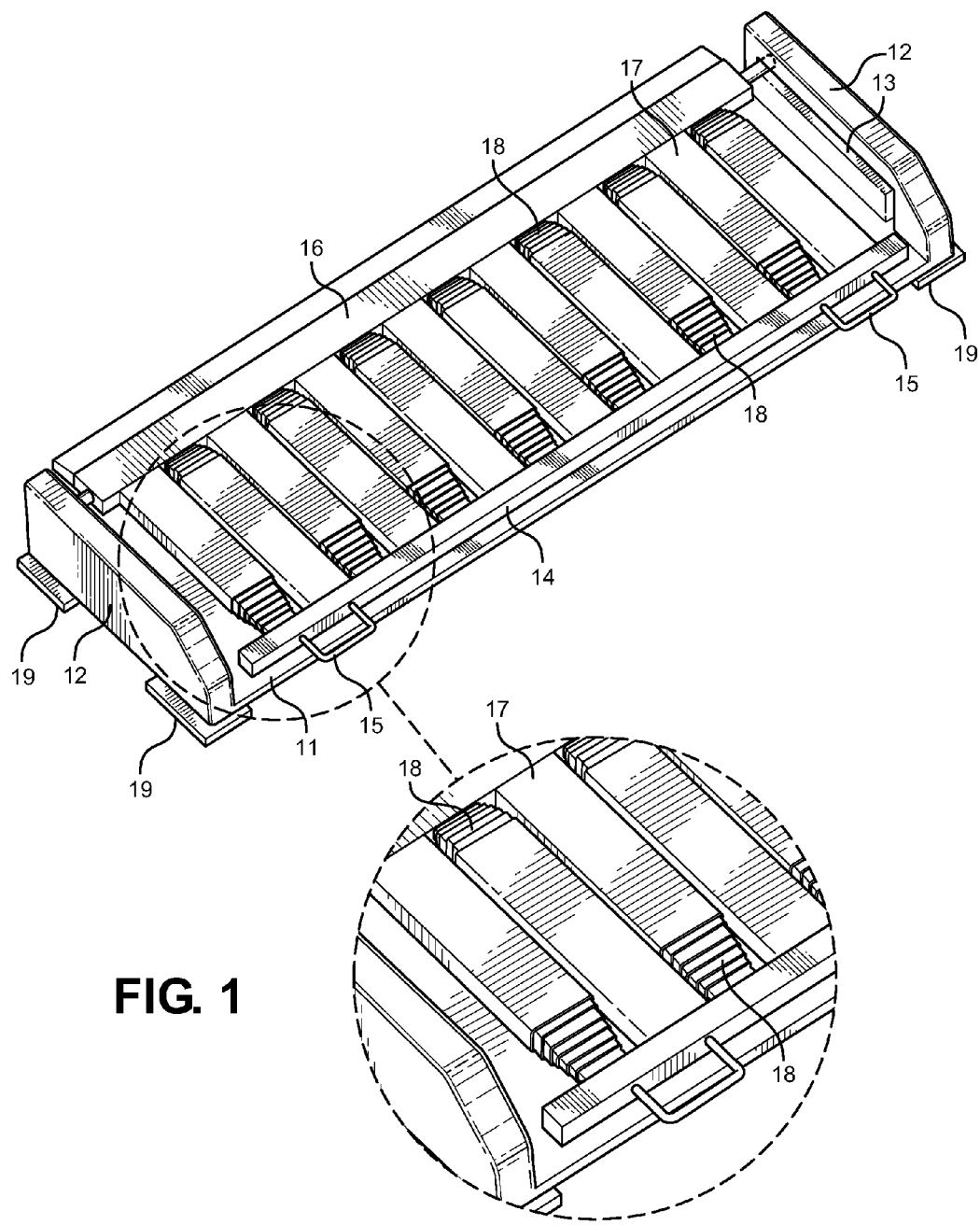
FIG. 1 shows an overhead view of the preferred embodiment of the present invention, along with a call-out highlighting the telescoping members in a stowed state.

Reference is made herein to the attached drawings. Like reference numerals are used throughout the drawings to depict like or similar elements of the tailgate ramp. For the purposes of presenting a brief and clear description of the present invention, the preferred embodiment will be discussed as used for loading a motorcycle into a pickup truck using a continuous and deployable ramp assembly. The figures are intended for representative purposes only and should not be considered to be limiting in any respect.

Referring now to FIG. 1, there is shown an overhead perspective of view of the tailgate ramp assembly of the present invention. The ramp assembly comprises an elongated frame 11 having a planar surface connecting to a first and second upstanding sidewall 12 positioned along the lateral ends of the frame 11. Between the upstanding sidewalls 12 is a collapsing ramp structure comprising a first 16 and second ramp 14 end, which connect to opposing ends of a plurality of telescoping ramp members 17 spanning the distance between ends 16, 14. The second ramp end 14 is adapted to be the base of the ramp when in a deployed state, and faces outward from a pickup truck tailgate. Handles 15 along the second end 14 allow the user to grip the base of the ramp and pull the ramp ends apart from one another and position the ramp within the frame 11.

Along each frame sidewall 12 is a channel 13 that supports the first end 16 of the ramp and allows the end 14 to be translated horizontally and vertically within the frame. This allows the ramp, when extended, to be positioned within the frame sidewalls 12 such that the ramp first end 16 may be positioned towards the end of the truck tailgate and in close proximity to the planar frame base 11. The vertical clearance between the end of the ramp and the frame is thus minimized and the ramp has clearance from the frame and tailgate to rotate towards the ground.

The collapsible ramp itself is comprised of a plurality of aligned and telescoping ramp members 17, which preferably comprise rectangular structures of progressively narrowing cross section to allow connected members to condense into one another in a manner of a telescoping length. In a preferred embodiment, the telescoping direction 18, wherein the smallest member is the most interior and the largest is exterior, is alternated between neighboring ramp members 17. This embodiment, as illustrated in FIG. 1, reduces gaps in the ramp between neighboring members, as the smallest interior member is positioned neighboring two larger, exterior members, and vise verse.

Figure 2:
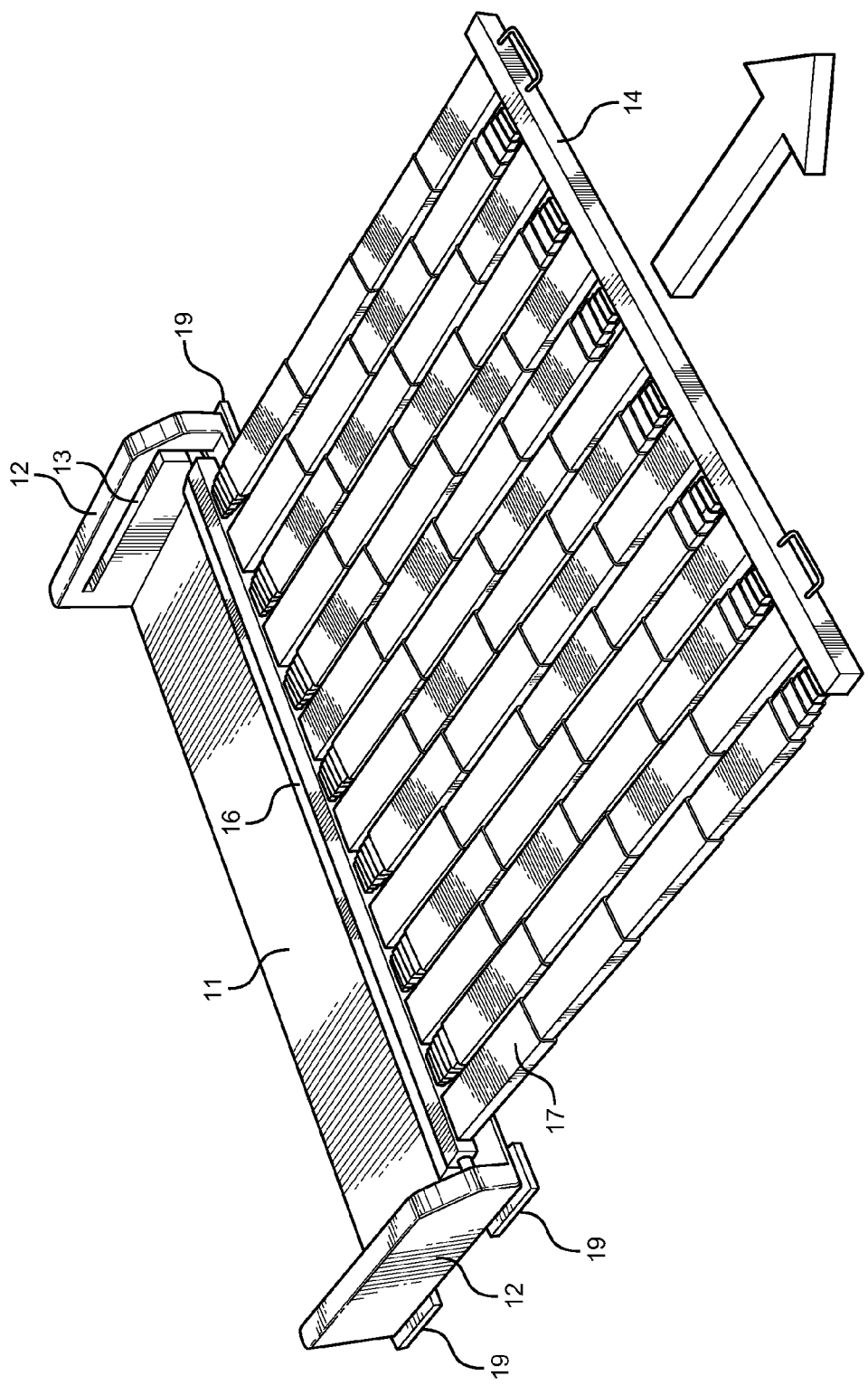
FIG. 2 shows a perspective view of the present invention being deployed from a stowed state to a working state, wherein the telescoping ramp members are being extended.

Referring now to FIG. 2, there is shown a perspective view of the tailgate ramp assembly of the present invention being deployed from a stowed state to a deployed state, wherein the ramp members 17 are being extended between the first 16 and second ramp 14 end. When deploying the ramp, a user grasps the handles of the ramp second end 14 and pulls the second end 14 away from the ramp first end 16. During this process the first end 16 translates within the ramp frame 11 along the channels 13 positioned along the frame sidewalls 12, until pin slider of the first end 16 reaches the horizontal end of the channel 13, whereafter it can slide vertically to align the first end 16 with the ramp planar base 11. Once in this position, the second end 14 is pulled, expanding the ramp members 17 into a deployed state. Each member section is pulled from within larger telescoping section thereof until the entire assembly is stretched to its maximum. After extension of the ramp, the ramp second end 14 is rested on the ground surface, whereafter a user may guide a motorcycle or similar item up the ramp and onto an elevated surface, such as a pickup truck tailgate. The base of the assembly frame is secured in position by a plurality of anchor members 19, which rest against the elevated surface and are preferably magnetized to prevent movement on ferric surfaces. This is particularly useful for exposed truck tailgates.

Figure 3:
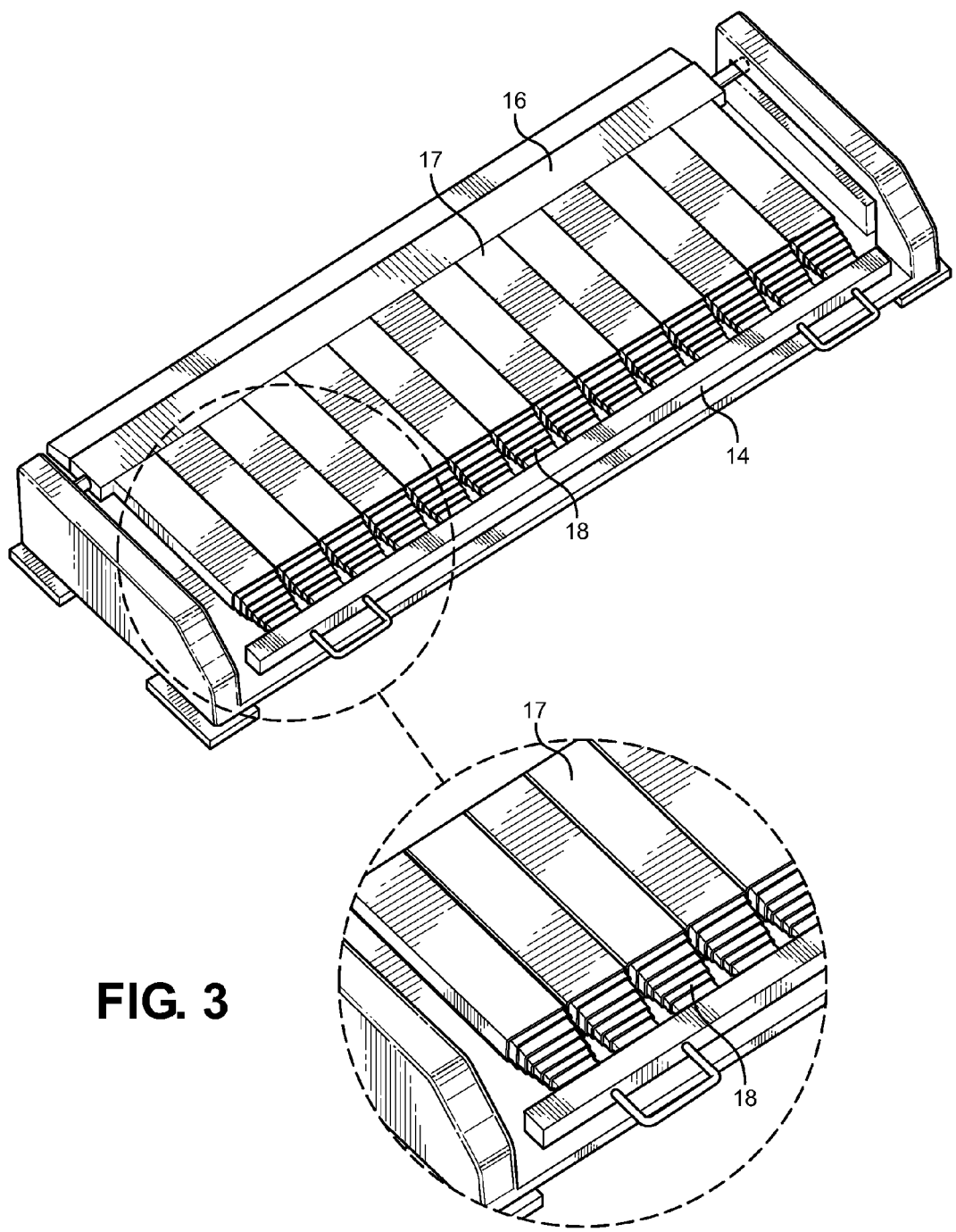
FIG. 3 shows an overhead view of an alternate embodiment of the present invention, along with a call-out highlighting the telescoping members in a stowed state.

Referring now to FIG. 3, there is shown a similar view as FIG. 1, wherein an overhead perspective view of the present invention is provided. In this view, an alternate embodiment of the assembly is visualized in a stowed state. In this embodiment, the telescoping members are 17 aligned in a uniform direction, wherein all members 17 telescope towards the second ramp end 14 when deployed. While this configuration has been shown to be effective, it produces slight gaps between the smaller member cross sections when deployed, as the telescoping design of the members requires progressively smaller cross sections in order to fit each member in corresponding member interior volumes.

Figure 4:
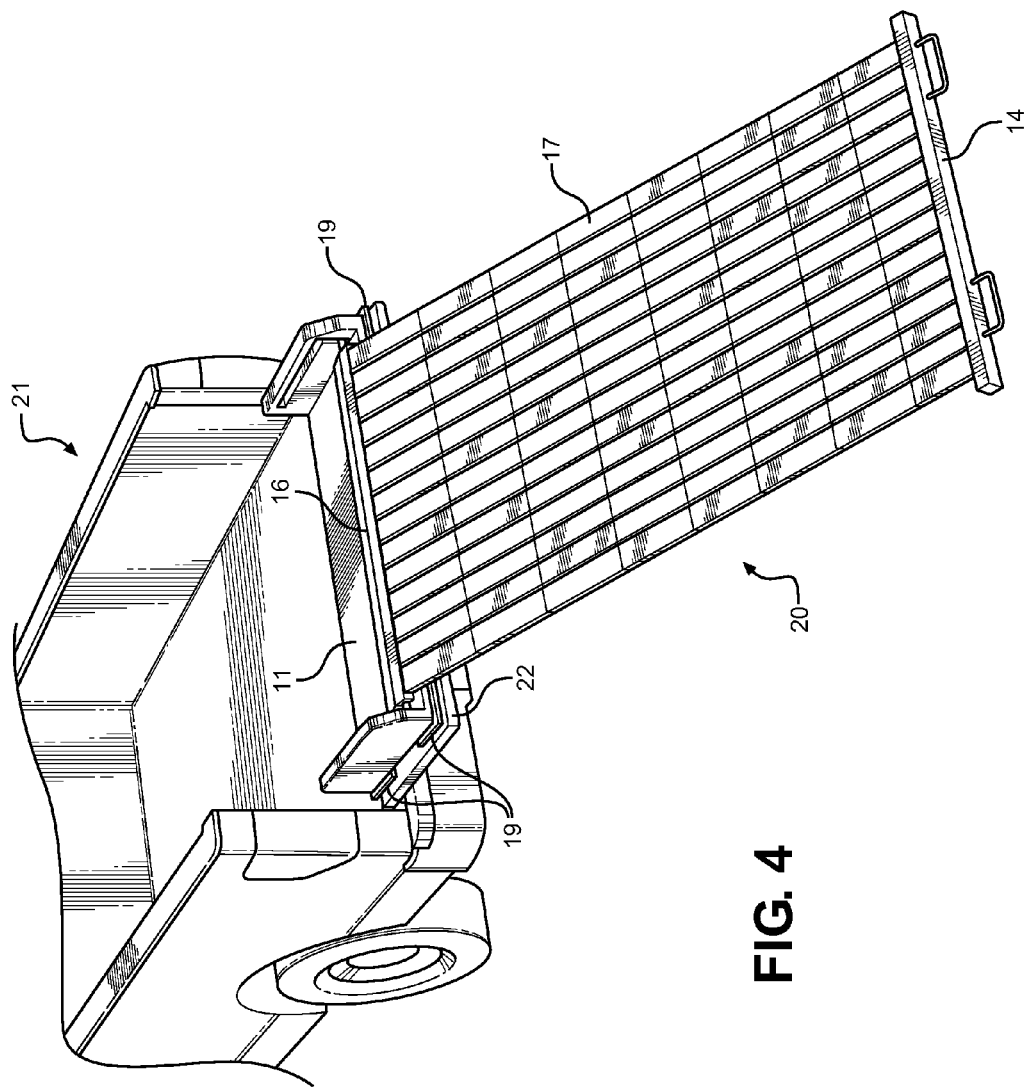
FIG. 4 shows a perspective view of the present invention in a working position, deployed along the tailgate of a pickup truck.

Referring now to FIG. 4, there is shown a perspective view of the present invention in a deployed and working state. The frame 11 of the assembly is adapted to rest along a deployed tailgate 22, wherein the magnetic anchors of the frame secure the assembly to the tailgate 22 during operation and deployment. When stowed, the assembly condenses within the interior of the frame 11 and the tailgate 22 can be repositioned into an upstanding configuration. The ramp assembly may remain attached to the tailgate or removed if desired. When deployed, the ramp second end 14 rests against a ground surface, while the first end 16 is positioned along the forward and base portion of the sidewall channel, such that the transition over the ramp first end 16 from the ramp 22 itself is minimized, and the motorcycle or other article may be rolled into the bed of the pickup truck 21. The connection between the ramp first end and the sidewall channel is one of a sliding pin connection, wherein a first and second outwardly protruding pin enters the channel and prevents the ramp assembly 22 from becoming dislodged or disconnected from the frame. The sliding pin is free to slide along the channel, using a bearing element or rolling pin action, wherein a forward detent in the channel locks the ramp end 16 in a working position. A second, reward detent may also be provided to lock the condensed ramp in a stowed configuration within the frame 11.

Figure 5:
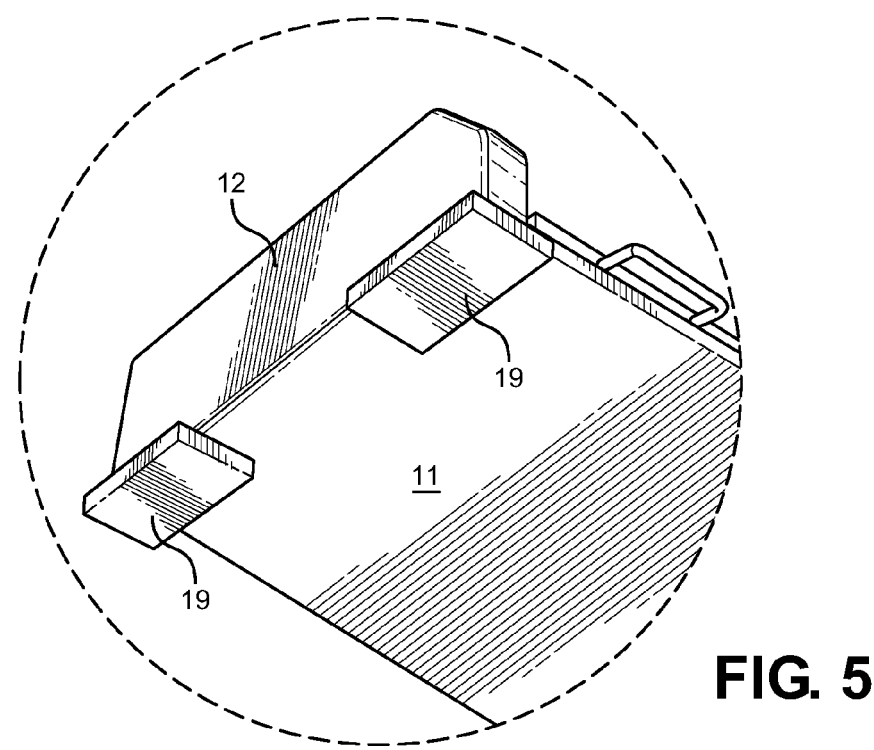
FIG. 5 shows an underside view of the present invention, wherein the magnetic anchors are shown.

Referring now to FIG. 5, there is shown an underside view of the frame of the present invention, wherein the planer portion 11 of the frame and one sidewall 12 is visualized. At the corner of the frame, there is provided an anchoring element 19, which is adapted to secure the entire assembly to a metallic pickup truck tailgate using a magnetic structure. This secures the present invention when stowed and when in operation, preventing movement of the assembly when moving heavy vehicles or objects up the ramp and while the user is standing thereon. Secure positioning of the anchors 19 is the key to preventing ramp movement, and thus eliminates the potential for property damage and personal injury while traversing the incline of the ramp.

Figure 6:
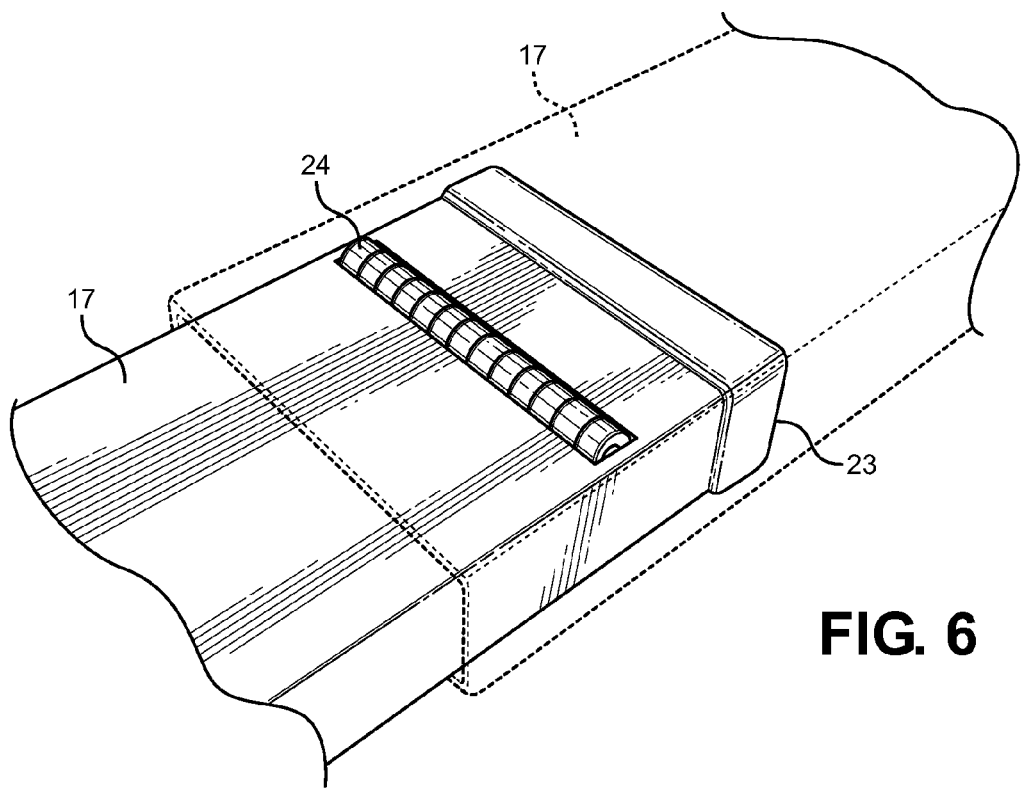
FIG. 6 shows a hidden view of an embodiment of the telescoping member connect, wherein a plurality of roller is utilized to reduce friction between the members and facilitate separation.

Referring now to FIG. 6, there is shown an embodiment of the connection between the telescoping ramp members 17, wherein a plurality of rollers or rolling member 24 is provided as a contact interface therebetween. The rollers 24 provide a continuous rolling surface that reduces friction associated with extending the members 17 from their condensed configuration. Each member comprises of a hollow interior having an interior surface and a step along the interior surface that acts as a stop for corresponding members, wherein a raised portion of each member exterior surface abuts against this interior step to prevent progressive members from disconnecting or being completely removable from one another. In a preferred embodiment, the members simply slide together without rollers, wherein sufficient clearance between stepped regions of the members and the surfaces of the members allow ready sliding relative to one another. Adequate clearances account for dirt, debris and potential rust build-up, which would otherwise seize the members together and prevent extension of the ramp.

Overall, the present tailgate ramp provides a unique ramp structure and supporting frame, wherein the frame is securely positioned on a pickup tailgate using a plurality of magnetic anchor members. It is submitted that Individuals can easily overexert themselves when attempting to place heavy objects in the beds of pickup trucks using traditional methods and tools. This can result in severe injury to the user, as well as the potential for considerable property damage if the object is dropped while being transferred to the truck bed's elevated height. Ramps are often used to avoid these occurrences; however, traditional ramps may require fasteners to secure to pickup truck tailgates, which may prove difficult to apply and a hassle to contend with. The present invention provides a means to easily place heavy objects within the bed of a pickup truck. The assembly features a telescopic ramp that is pivotable from a frame channel member, where the assembly is readily affixed to a tailgate using strong permanent magnets. The magnets keep the ramp secured along the truck tailgate, allowing users to safely move heavy items up the ramp without fear of the ramp sliding or falling. After use, the ramp can be easily removed, retracted, stored or transported for future use. The assembly provides consumers with a secure and convenient alternative to traditional ramps devices, wherein the present invention advances the art of tailgate ramp devices.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A telescoping tailgate ramp assembly, comprising:
    a frame having an elongated planar interior portion and laterally positioned and upstanding sidewalls;
    said frame having a forward end and a rear end;
    said sidewalls comprising an interior surface having a channel adapted to accept a ramp assembly sliding pin, said channel having a horizontal portion and a vertical portion, said vertical portion positioned towards said forward end of said frame;
    a ramp assembly comprising a first end, a second end, and a plurality of telescoping ramp members connecting said first end and said second end;
    said second end of said ramp assembly comprising an elongated support to which each of said plurality of telescoping members is secured;
    wherein said plurality of ramp members are permanently arranged in a side-by-side manner so as to form a substantially continuous surface;
    said ramp members comprising connected hollow members defining a telescoping direction towards progressively decreasing cross section, wherein smaller cross section members fit within the interior of larger cross section members to form a shortened, condensed ramp state and an extended, deployed ramp state;
    said first end of said ramp assembly being connected to said frame sidewall via a first and a second sliding pin connected into said frame sidewall channel;
    said first sliding pin and said second sliding pin adapted to be positioned along said channel horizontal portion towards said frame rear end when said ramp assembly is in said condensed state;
    said first sliding pin and said second sliding pin adapted to be positioned along said channel vertical portion when said ramp assembly is in said extended state;
    said frame having underside anchor elements.

2. The device of claim 1, wherein said anchor elements are permanent magnets.

3. The device of claim 1, wherein said telescoping ramp members are aligned such that said telescoping direction of said members alternates direction between neighboring members.

4. The device of claim 1, wherein each of said ramp members comprises:
    a hollow interior having an interior surface and an inward step along said interior surface;
    an exterior surface having raised portions at a terminal end;
    said inward step adapted to contact said raised exterior portion and act as a contact stop that prevents said hollow members from disconnecting or being completely removable from one another.

5. The device of claim 1, wherein each ramp member comprises at least one roller as a contact interface between said hollow members to facilitate relative motion thereof.

6. The device of claim 1, wherein ramp assembly second end further comprises at least one user handle for extending said ramp assembly and separating said first and second ramp end.

* * * * *